(12) United States Patent
Kato et al.

(10) Patent No.: US 8,229,275 B2
(45) Date of Patent: Jul. 24, 2012

(54) METHOD FOR CONTROLLING RECORDER AND APPARATUS FOR CONTROLLING RECORDER

(75) Inventors: Tatsuya Kato, Tokyo (JP); Hajime Utsunomiya, Tokyo (JP)

(73) Assignee: TDK Coropration, Tokyo (JP)

( * ) Notice: Subject to any disclaimer, the term of this patent is extended or adjusted under 35 U.S.C. 154(b) by 1044 days.

(21) Appl. No.: 12/141,214

(22) Filed: Jun. 18, 2008

(65) Prior Publication Data

US 2008/0317430 A1 Dec. 25, 2008

(30) Foreign Application Priority Data

Jun. 25, 2007 (JP) ................................ 2007-165943

(51) Int. Cl.
*H04N 9/80* (2006.01)

(52) U.S. Cl. .............. 386/241; 386/26; 386/27; 386/33; 386/34; 386/46; 386/109; 386/111; 386/112; 386/123; 386/124

(58) Field of Classification Search .................... 386/26, 386/27, 33, 34, 46, 109, 111, 112, 123, 124
See application file for complete search history.

(56) References Cited

U.S. PATENT DOCUMENTS

| | | | |
|---|---|---|---|
| 5,659,745 A | 8/1997 | Inoue | |
| 6,157,772 A | 12/2000 | Kim | |
| 7,385,884 B2 | 6/2008 | Hamada et al. | |
| 2002/0186961 A1 | 12/2002 | Kikuchi et al. | |
| 2003/0099460 A1 | 5/2003 | Imada et al. | |
| 2004/0146282 A1* | 7/2004 | Lee | ................................. 386/95 |
| 2005/0083812 A1 | 4/2005 | Miyamoto et al. | |

FOREIGN PATENT DOCUMENTS

| | | | |
|---|---|---|---|
| CN | 1250317 A | | 4/2000 |
| JP | 4125882 A | | 4/1992 |
| JP | 11328937 | * | 11/1999 |
| JP | 11328937 A | | 11/1999 |
| JP | 200011615 A | | 1/2000 |
| JP | 2000011615 | * | 1/2000 |
| JP | 2001223929 A | | 8/2001 |
| JP | 2001344762 | * | 12/2001 |
| JP | 2001344762 A | | 12/2001 |

OTHER PUBLICATIONS

Official Letter in corresponding Japanese Patent Application No. JP 2007-165943.

* cited by examiner

*Primary Examiner* — Jeffrey Pwu
*Assistant Examiner* — Hee Song
(74) *Attorney, Agent, or Firm* — Porzio, Bromberg & Newman, P.C.

(57) ABSTRACT

A method and apparatus for controlling a video camera recorder or the like, capable of flexibly meeting user demands for image quality, recording time, etc. When recording information on a rewritable optical recording medium, the recording mode for the optical recording medium is selected at least from between write-once and rewritable based on a set recording rate. Before recording, the recording status of the optical recording medium is also determined at least between an unrecorded area and a recorded area.

11 Claims, 5 Drawing Sheets

METHOD FOR CONTROLLING RECORDER AND APPARATUS FOR CONTROLLING RECORDER

BACKGROUND OF THE INVENTION

1. Field of the Invention

The present invention relates to a method and an apparatus for controlling a recorder, including a video camera recorder which can shoot landscapes, persons, and the like, and record them as moving image information, and an editing recorder which edits this moving image information and so on.

2. Description of the Related Art

Conventionally, video camera recorders such as a handy video camera have been used to shoot surrounding environment and retain it for record. While various types of tape recorders used to be used as recording media, optical recording media such as CD and DVD have been increasingly adopted for the recording media recently as described in Japanese Patent Application Laid-Open No. 2001-223929.

Video camera recorders for recording moving image information on an optical recording medium when necessary include such components as: an image conversion unit for receiving ambient tight and converting it into moving image information; a recording mechanism for recording this moving image information on an optical recording medium; an optical mechanism for performing zooming and a focus control by using a lens and the like; and a battery unit for functioning as a power supply.

Now, with the prevalence of TV sets that can deliver HDTV images, video camera recorders for business use have also been requiring high-definition shooting of moving images recently. In consequence, the video camera recorders are growing in the amount of moving image information per shooting time. To meet this demand, commercialization has started of so-called next-generation DVDs which are capable of recording a large volume of moving image information. For example, the Blu-ray Disc (BD) standard makes it possible to record moving images up to 25 GB on a single recording layer, with the objective lens of the foregoing recording mechanism set to 0.85 in numerical aperture.

Since the video camera recorders are required to record captured moving image information on their optical recording medium in real time, the compression format (recording rate) of the moving image information is of high importance. For example, a moving image compression format that requires a recording rate of 100 Mbps can record high-definition moving images since the rate of transfer to the optical recording medium is high. A moving image compression format with a recording rate of 35 Mbps can only record low-definition moving images since the rate of transfer to the optical recording medium is low. In the meantime, the moving image compression format requiring the recording rate of 100 Mbps can only record moving images on an optical recording medium for a short time since the amount of information to be transferred is high. The moving image compression format with the recording rate of 35 Mbps can record moving images on an optical recording medium for long hours since the amount of information to be transferred is low.

Moving image information that has been captured by a video camera recorder and recorded on an optical recording medium is edited by an editing recorder, installed in a studio or the like, and recorded on an optical recording medium. This editing recorder is also required to edit moving image information of high definition at high speed. The recording rate is thus essential as is the case with the foregoing.

For recorders in business use, like ones intended for producing programs in TV stations, it is essential to provide both high-definition images and sufficient recording time in a consistent fashion. In particular, video camera recorders must by all means avoid the situation of being completely unavailable for shooting due to an insufficient capacity of their optical recording medium. Optical recording media of rewritable type are adopted for this reason.

These rewritable optical recording media, however, have had the problem that the recording rate is harder to increase since the recording marks are formed by causing a phase change in their information recording layer by means of laser-based heating and cooling. In other words, despite the video camera recorders being for business use, the necessity of avoiding the unrecordable situation has set a certain limit in increasing the image definition.

SUMMARY OF THE INVENTION

The present invention has been achieved in view of the foregoing problem. It is thus an object of the present invention to provide a control method and a control apparatus for making a recorder achieve both high-definition recording and the prevention of the unrecordable state in a consistent fashion, thereby improving convenience.

The inventor has made intensive studies and achieved the foregoing object by the provision of the following means.

That is, to achieve the foregoing object, the present invention provides a method for controlling a recorder for recording information on a rewritable optical recording medium, the method including: a mode selection step of selecting a recording mode for the optical recording medium at least from between rewritable and write-once, based on a set recording rate; and a recording determination step of determining a recording status of the optical recording medium at least between an unrecorded area and a recorded area.

To achieve the foregoing object, the method for controlling a recorder according to the foregoing invention further includes a time calculation step of calculating an available recording time of the optical recording medium based both on the recording mode and on the recording status.

To achieve the foregoing object, the method for controlling a recorder according to the foregoing invention is such that the time calculation step includes calculating the available recording-time with the unrecorded area as a recordable area if the recording mode is write-once, and with at least the unrecorded area as a recordable area if the recording mode is rewritable.

To achieve the foregoing object, the method for controlling a recorder according to the foregoing invention includes an erase step of erasing at least the recorded area completely to create an unrecorded area if the recording mode is write-once, and quick erasing the recorded area to create a quick erase area if the recording mode is rewritable.

To achieve the foregoing object, the method for controlling a recorder according to the foregoing invention is such that the recording determination step includes determining the recording status of the optical recording medium at least between an unrecorded area, a recorded area, and a quick erase area.

To achieve the foregoing object, the method for controlling a recorder according to the foregoing invention further includes a time calculation step of calculating an available-recording time of the optical recording medium based both on the recording mode and on the recording status.

To achieve the foregoing object, the method for controlling a recorder according to the foregoing invention is such that the time calculation step includes calculating the available recording time with the unrecorded area as a recordable area if the recording mode is write-once, and with the unrecorded area and the quick erase area as a recordable area if the recording mode is rewritable.

To achieve the foregoing object, the method for controlling a recorder according to the foregoing invention includes an erase step of erasing the recorded area or the quick erase area completely to create an unrecorded area if the recording mode is write-once, and quick erasing the recorded area to create a quick erase area if the recording mode is rewritable.

To achieve the foregoing object, the method for controlling a recorder according to the foregoing invention is such that the erase step includes recording management information on the optical recording medium, the management information being intended for identifying the newly-created unrecorded area or quick erase area.

To achieve the foregoing object, the method for controlling a recorder according to the foregoing invention is such that the erase step is performed when the available recording time of the optical recording medium falls below a desired recording time.

To achieve the foregoing object, the method for controlling a recorder according to the foregoing invention includes a recording rate resetting step of prompting a user to modify or reselect the recording rate if the available recording time calculated at the time calculation step falls below a desired recording time.

To achieve the foregoing object, the method for controlling a recorder according to the foregoing invention includes a recording step of recording management information on the optical recording medium, the management information being intended for identifying the newly-created recorded area.

The foregoing object of the present invention has also been achieved by the provision of an apparatus for controlling a recorder for recording captured moving image information on an optical recording medium when necessary, the apparatus including: a mode selection unit for selecting a recording mode for the optical recording medium at least from between rewritable and write-once, based on a set recording rate; and a recording determination unit for determining a recording status of the optical recording medium at least between an unrecorded area and a recorded area.

According to the present invention, it is possible to provide an excellent effect that the image quality level and the available recording time suitable for the intended use can be set depending on the shooting condition and the editing condition.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Hereinafter, an embodiment of the present invention will be described with reference to the drawings.

Figure 1:
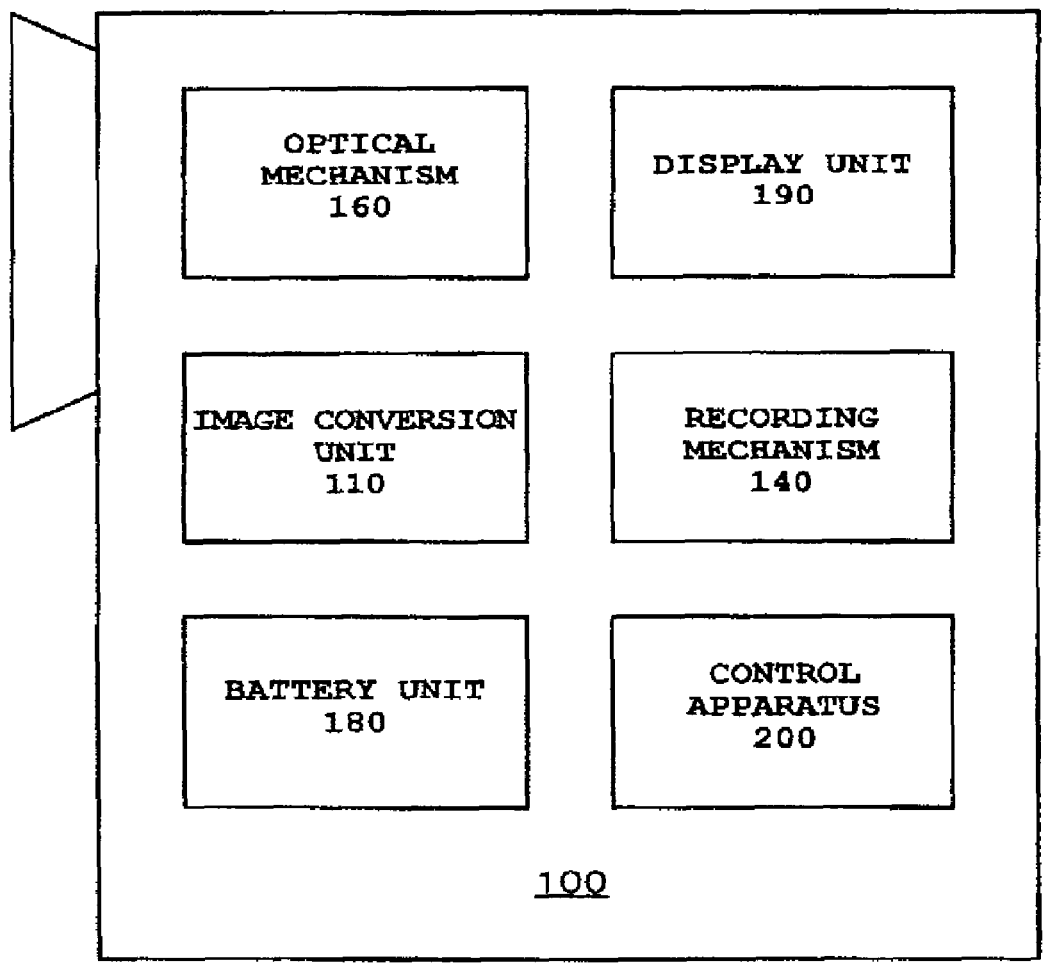
FIG. 1 is a block diagram showing a schematic configuration of a video camera recorder to which a control method according to an embodiment of the present invention is applied.

FIG. 1 shows a schematic configuration of a video camera recorder 100. This video camera recorder 100 includes: an image conversion unit 110 for receiving ambient light and converting it into moving image information; a recording mechanism 140 for recording this moving image information on an optical recording medium 1; an optical mechanism 160 for operating a lens and the like for focus control; a battery unit 180 for functioning as a power supply; a display unit 190 for displaying shot images and various operation commands on-screen; and a control apparatus 200 for controlling these functional components.

Figure 2A:
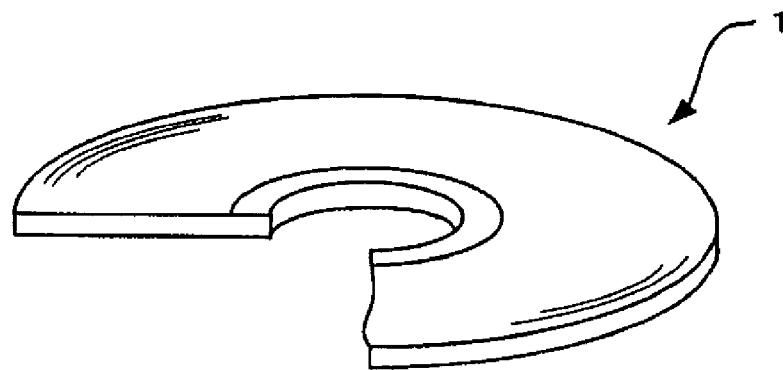
FIGS. 2A and 2B are enlarged views showing an optical recording medium for use in the video camera recorder.
Figure 2B:
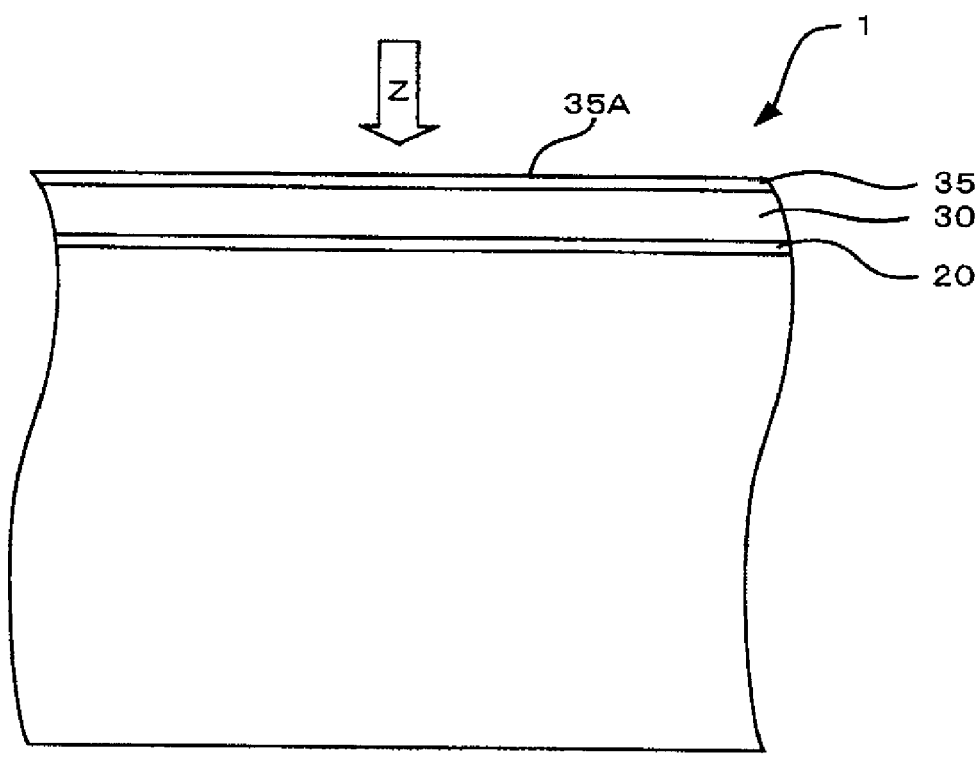

As shown in FIG. 2A, the optical recording medium 1 is a disc-like medium, having an outer diameter of approximately 120 mm and a thickness of approximately 1.2 mm. As enlarged in FIG. 2B, the optical recording medium 1 is formed by stacking a substrate 10, an information recording layer 20, a cover layer 30, and a hard coat layer 35 in this order. The cover layer 30 and the hard coat layer 35 have alight-transmitting characteristic, and transmit laser light which is incident from exterior. The laser light incident on the light incident surface 35A is thus transmitted through the hard coat layer 35 and the cover layer 30 in this order to reach the information recording layer 20, whereby information retained in the information recording layer 20 is read. Note that the information recording layer 20 in this optical recording medium 1 has a recording capacity of 25 GB.

The substrate 10 is a disc-like member having a thickness of approximately 1.1 mm. The substrate 10 may be made of various materials including glass, ceramic, and resin, whereas it is made of polycarbonate resin here. Aside from polycarbonate resin, available resins include olefin resin, acrylic resin, epoxy resin, polystyrene resin, polyethylene resin, polypropylene resin, silicone resin, fluorine-based resin, ABS resin, and urethane resin. Of these, polycarbonate resin and olefin resin are preferable in view of workability and moldability. Grooves, lands, pit trains, or the like are also formed in/on the surface of the substrate 10, on the side of the information recording layer, depending on the intended use.

The cover layer 30 may be made of various materials. As mentioned previously, it must be made of a light-transmitting material, however, so as to transmit the laser light. For example, ultraviolet-curing acrylic resin can be used favorably. This optical recording medium 1 is configured so that the cover layer 30 and the hard coat layer 35 have a thickness of 100 μm in total. The distance from the light incident surface 35A to the information recording layer 20 is thus approximately 100 μm.

The information recording layer 20 is the layer for retaining data. The data is retained in rewritable mode, where data-written areas can be erased and written with data again.

Figure 3:
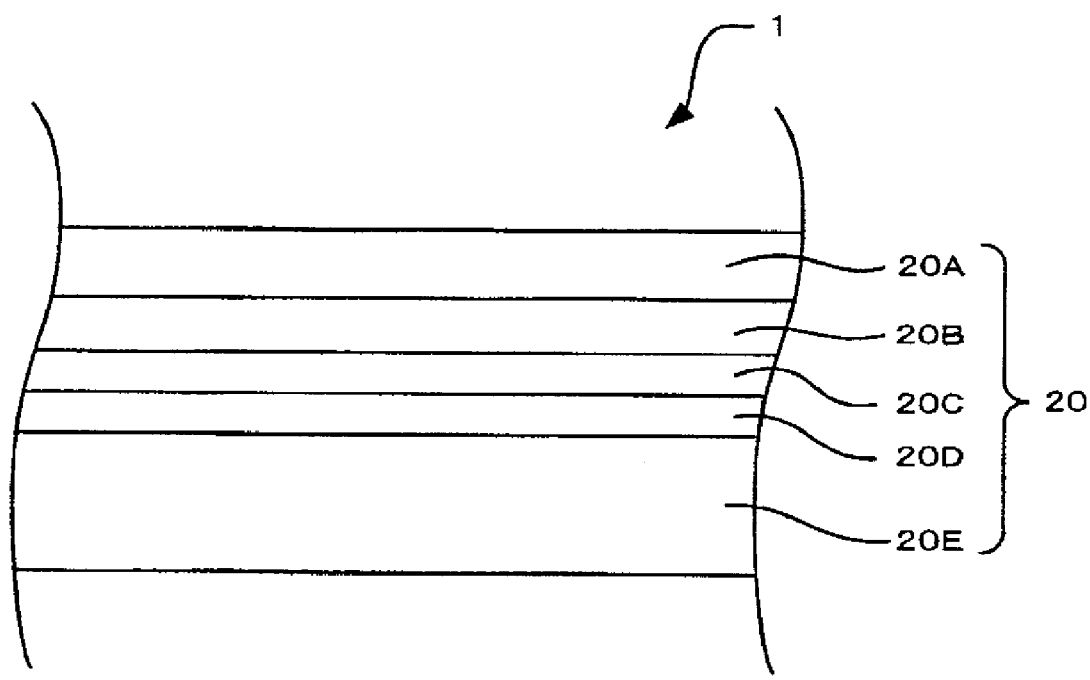
FIG. 3 is an enlarged view showing an information recording layer of the optical recording medium.

FIG. 3 shows a detailed configuration example of the information recording layer 20 of rewritable phase change type. The information recording layer 20 has a heat sink layer 20A, a first dielectric layer 20B, a recording film 20C, a second dielectric layer 20D, and a reflecting film 20E which are stacked in this order from the side of the light incident surface.

The heat sink layer 20A is made of AlN, with a thickness of 30 nm. The first dielectric layer 20B is made of ZnS—$SiO_2$ (80-20) with a thickness of 20 nm. The recording film 20C is made of SbTeGe (75:20:25) with a thickness of 10 nm. The second dielectric layer 20D is made of ZnS—$SiO_2$ (80:20) with a thickness of 15 nm. The reflecting film 20E is made of Ag with a thickness of 100 nm.

The recording capacity of the information recording layer 20 is determined by the size (a real dimensions) of the recording area and the recording density. Since the recording area is physically limited, the present embodiment increases the recording density by increasing the linear density of each recording mark, i.e., reducing the length of a unit recording mark in a tangential direction. In other words, the recording capacity can be increased by reducing the minimum mark length of recording marks to be formed on the information recording layer 20 in the spiral direction.

Figure 4:
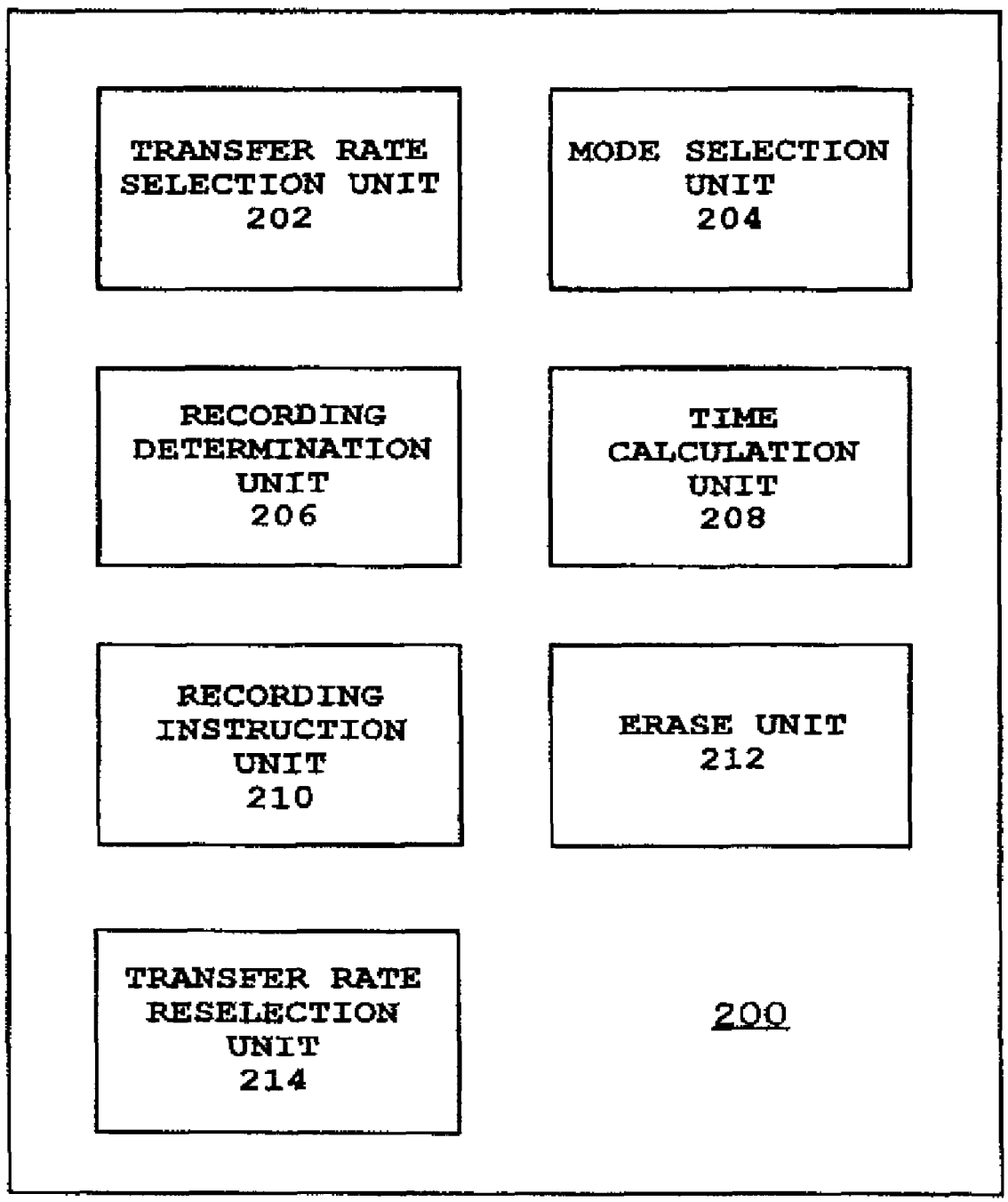
FIG. 4 is a block diagram showing the configuration of a control apparatus for implementing the control method.

FIG. 4 shows the configuration of the control apparatus 200 in the video camera recorder 100. This control apparatus 200 includes a recording rate selection unit 202, a mode selection unit 204, a recording determination unit 206, a time calculation unit 208, a recording instruction unit 210, an erase unit 212, and a recording rate reselection unit 214. The configuration of this control apparatus 200 is achieved by electric operations of various electronic components, including a CPU (Central Processing Unit) which is not shown in particular, and a memory which contains programs for providing respective functions when processed by the CPU.

The recording rate selection unit 202 displays a list of recording rates on the display unit 190 of the video camera recorder 100, and prompts the user to select a recording rate desired. This makes it possible to select a desired recording rate by selecting the recording rate with operation buttons, a touch panel, or the like. The present embodiment is configured so that the recording rate can be selected from among four alternatives, 35 Mbps, 50 Mbps, 75 Mbps, and 100 Mbps. Since the recording rate is equivalent to the image quality of the moving image to record, a list of image quality levels may be displayed instead of the recording rates so that the user is prompted to select desired image quality.

The mode selection unit 204 selects the recording mode for the optical recording medium 1 at least from between write-once and rewritable based on the recording rate (image quality) set by the user. The write-once recording mode refers to a recording method intended for so-called write-once optical recording media. It can be applied to a completely unrecorded area of the optical recording medium 1. The rewritable recording mode refers to a recording method intended for so-called rewritable optical recording media, It can erase recording marks and overwrite new recording marks simultaneously even if some recording marks are formed on that area of the optical recording medium 1. While the present embodiment employs the rewritable optical recording medium 1 as its optical recording medium, this optical recording medium, despite being of rewritable type, is also written by the write-once recording method when needed.

More specifically, the mode selection unit 204 adopts the write-once recording method if the recording rate (image quality) is high, and adopts the rewritable recording method if the recording rate (image quality) is low. Because of the properties of the information recording layer 20, the optical recording medium 1 according to the present embodiment can repeat recording at recording rates of 35 to 70 Mbps, but cannot beyond the recording rate of 70 Mbps. The selection threshold of the mode selection unit 204 is thus set to 70 Mbps. The write-once recording is selected if the recording rate exceeds 70 Mbps (if it is 75 Mbps or 100 Mbps), and the rewritable recording is selected if below 70 Mbps (if 35 Mbps or 50 Mbps).

The recording determination unit 206 determines the recording status of the optical recording medium 1 at least between an unrecorded area, a recorded area, and a quick erase area. Unrecorded areas refer to where no recording mark is formed on the information recording layer 20. These areas have never been recorded, or recording marks have been erased completely. Recorded areas refer to where recording marks are formed on the information recording layer 20 and are used as information. Quick erase areas refer to where recording marks remain on the information recording layer 20 but are no longer used as information. The statuses of these unrecorded, recorded, and quick erase areas are recorded on a management area of the optical recording medium 1 as management information, and can thus be grasped by reading this management information.

The time calculation unit 208 calculates the available recording time of the optical recording medium 1 based both on the recording mode selected by the mode selection unit 204 and on the recording statuses of the optical recording medium 1 determined by the recording determination unit 206. Specifically, when in the write-once recording mode, unrecorded areas are determined to be recordable areas. The time calculation unit 208 calculates how much time of recording these unrecorded areas are available for at the recording rate requested. When in the rewritable recording mode, unrecorded areas and quick erase areas are determined to be recordable areas. The time calculation unit 208 calculates how much time of recording these unrecorded areas and quick erase areas are available for at the recording rate requested. In the case of rewritable type, the quick erase areas can be included in the recordable areas since it is possible to erase the recording marks while recording new information.

The recording instruction unit 210 instructs the recording mechanism 140 to record moving image information generated by the image conversion unit 110, onto the optical recording medium 1 in the foregoing recording mode. Since the unrecorded areas or quick erase areas decrease and the recorded areas increase after the completion of the recording, the recording instruction unit 210 instructs the recording mechanism 140 to record management information for identifying this change of areas onto the management area of the optical recording medium 1.

The erase unit 212 erases recorded areas or quick erase areas of the optical recording medium 1 completely to create unrecorded areas when in the rewritable recording mode. The resulting increase of the unrecorded areas increases the recording time available for write-once recording. Note that this erase step requires a certain amount of erase time since it erases actual recording marks in order.

When in the rewritable recording mode, on the other hand, the erase unit 212 quick erases recorded areas to create quick erase areas. This increase of the quick erase areas increases the recording time available for rewritable recording. Note that this erase step takes only a short erase time since it does not erase actual recording marks in succession but only records new management information for enabling overwriting and erasing.

This erase unit 212 also records management information for identifying the unrecorded areas or quick erase areas that are newly created through the erase step, onto the management area of the optical recording medium 1. In other words, the management information pertaining to the recording statuses of the optical recording medium 1 is updated so that the recording determination unit 206 can determine the recording statuses properly.

Note that this erase unit 212 is typically activated as needed when the user decides that the available recording time calculated by the time calculation unit 208 is insufficient.

The recording rate reselection unit 214 prompts the user on-screen to modify or reselect the recording rate if the available recording time calculated by the time calculation unit 208 is insufficient. Consequently, the user can select freely whether to erase unnecessary information to increase the available recording time by using the erase unit 212, or to lower the image quality to increase the available recording time without erasing.

Figure 5:
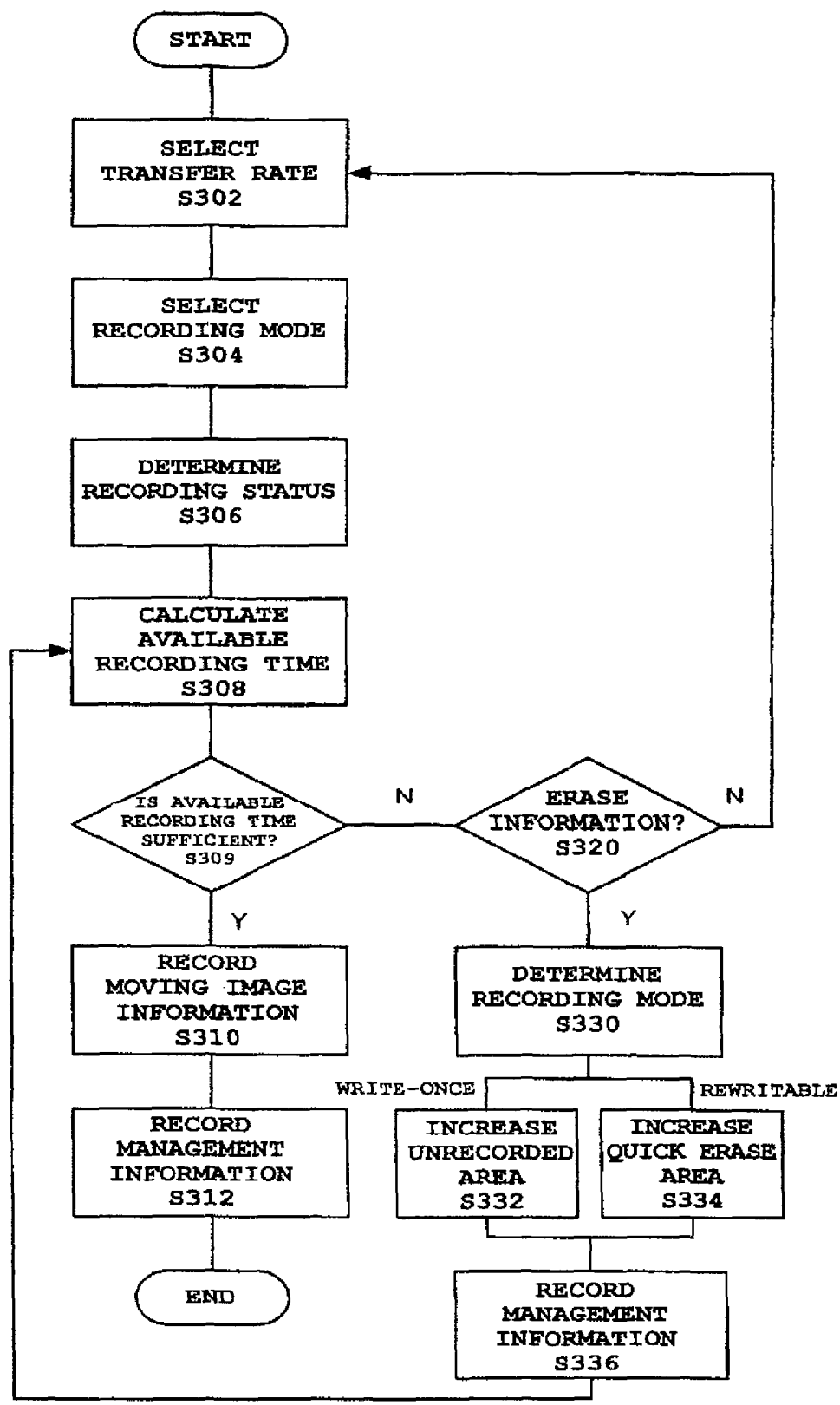
FIG. 5 is a flowchart showing the control method.

Next, the control method of this video camera recorder 100 will be described with reference to the flowchart of FIG. 5.

Initially, at step 302, the recording rate selection unit 202 displays a list of recording rates on the image display unit of the video camera recorder 100, prompting the user to select a desired recording rate from this list of recording rates. Next, at step 304, the mode selection unit 204 selects the recording mode for the optical recording medium 1 at least from between write-once and rewritable, based on the recording rate (image quality) set by the user. As mentioned previously, the write-once recording is selected here if the recording rate is 75 Mbps or 100 Mbps, i.e., above 70 Mbps. The rewritable recording is selected if 35 Mbps or 50 Mbps, i.e., below 70 Mbps.

Next, at step 306, the recording determination unit 206 determines the recording status of the optical recording medium 1 at least between an unrecorded area, a recorded area, and a quick erase area. At step 308, the time calculation unit 208 calculates the available recording time of the optical recording medium 1 based both on the recording mode selected by the mode selection unit 204 and on the recording status of the optical recording medium 1 determined by the recording determination unit 206. At step 309, the user is prompted to determine whether the available recording time is sufficient or not. If the user determines it to be sufficient, the processing proceeds to step 310 to record moving image information on the optical recording medium 1 at the foregoing recording rate in the foregoing recording mode, based on instructions from the recording instruction unit 210. After the completion of the recording, the management information for identifying this change of areas is updated (step 312).

If the user determines at step 309 that the available recording time is insufficient, the processing proceeds to step 320 to prompt the user to select whether to erase unnecessary information for the sake of maintaining the current recording rate (image quality) or to lower the recording rate (image quality) without erasing information If the user selects to erase information, the processing proceeds to step 330 to erase the information. In the erase step, the recording mode is determined initially (step 330). If in the write-once recording mode, the processing proceeds to step 332, where recorded areas or quick erase areas of the optical recording medium 1 are completely erased to increase unrecorded areas. This increase of the unrecorded areas increases the recording time available for write-once recording. If in the rewritable recording mode, on the other hand, the processing proceeds to step 334, where recorded areas are quick erased to increase quick erase areas. This increase of the quick erase areas increases the recording time available for rewritable recording. After each of the erase steps, the management information for identifying the newly-created unrecorded areas or quick erase areas is updated (step 336). The processing returns to step 308 to calculate the recording time again.

If the user selects at step 320 to change the recording rate (image quality), the processing returns to step 302. The list of recording rates is displayed on the image display unit of the video camera recorder 100, prompting the user to modify or reselect the desired recording rate from this list of recording rates. After the recording rate is lowered, the processing goes through the same steps.

This video camera recorder 100 uses the optical recording medium 1 of rewritable type as its recording medium, with both the rewritable and write-once recording methods in combination. The rewritable recording method has lower recording rates as compared to the write-once recording method, but provides greater areas available for recording since it can overwrite quick erase areas during recording. The write-once recording method, on the other had, features higher recording rates, whereas it can record on unrecorded areas alone. With their respective advantages and disadvantages, the recording methods can thus be switched for recording based on the user-specified recording rate automatically, thereby improving convenience.

With the switching of the recording methods, the present embodiment in particular is configured to calculate the recording time available for each individual recording mode and show the result to the user. As a result, the user can select whether to give priority to the recording rate (image quality) or to securing the recording time, and can thus meet requirements in the shooting environment flexibly. For example, in situations where a moving image of high quality is desired, priority is given to the recording rate than to the recording time. In situations where the recording time is desired to be secured, priority is given to increasing the recording time than to the recording rate.

In the video camera recorder 100 according to the present embodiment, the erase methods are also switched depending on the recording mode. This makes it possible, through the erase operations, to secure a recording time as long as possible while satisfying the recording rate required.

When the recorded, unrecorded, and quick erase areas of the optical recording medium 1 are changed by erase operations or recording operations, the management information stored in the management area is updated. This management information can thus be read to identify the latest recording statuses easily.

Moreover, in the present embodiment, the recording rate once set can be modified subsequently. It is therefore possible to lower the recording rate for increased recording time when the recording time is insufficient. In particular, when changing from a high recording rate in the write-once range to a low recording rate in the rewritable range, the recording mode is automatically switched to include quick erase areas into recordable areas. This allows a further increase of the available recording time.

Up to this point, the present embodiment has been described only for the case of prompting the user to select a recording rate. The present invention is not limited thereto, however, and the user may be prompted to select image quality.

The present embodiment has also dealt with the case of selecting a recording rate from among the four alternatives, whereas the present invention is not limited thereto. The present embodiment has also dealt with an optical recording medium of BD standard as an example. The present invention is not limited thereto, however, and optical recording media of other standards may be used as well.

The present embodiment has also dealt with the video camera recorder 100 for capturing moving images and records them when necessary. The present invention is not limited thereto, however, and may be applied to an editing recorder and the like for editing, duplicating, and otherwise processing moving images recorded on a medium. For example, a recorder of this type, installed in a studio or the like, edits moving image information that has been recorded on a recording medium by a video camera recorder. This editing recorder is also required to edit the moving image information in various definition levels at high speed. The application of the present invention therefore makes it possible to set the image quality level and the available recording time suitable for the intended use flexibly, thereby improving the efficiency of the editing operations.

It is understood that the control method and the control apparatus of the present invention are not limited to the foregoing embodiment, and various modifications may be made without departing from the gist of the present invention.

The method and apparatus for controlling a video camera recorder according to the present invention may be applied to various types of devices for shooting moving video images.

The entire disclosure of Japanese Patent Application No. 2007-165943 filed on Jun. 25, 2007 including specification, claims, drawings, and summary are incorporated herein by reference in its entirety.

What is claimed is:

1. A method for controlling a recorder for recording information on a rewritable optical recording medium including an unrecorded area, the method comprising:
   a mode selection step of selecting a recording mode for the optical recording medium at least from between rewritable and write-once, based on a set recording rate, when start recording;
   a recording determination step of determining a recording status of the optical recording medium at least between the unrecorded area, a recorded area and a quick erase area to be created by quick erasing the recorded area, when start recording;
   a time calculation step of calculating an available recording time of the optical recording medium with the unrecorded area as a recordable area if the selected recording mode is write-once, and with both the unrecorded area and the quick erase area as a recordable area if the selected recording mode is rewritable; and
   a recording step of recording information on the optical recording medium, information is recorded on the unrecorded area if the selected recording mode is write-once, and information is recorded on both of the unrecorded area and the quick erase area if the selected recording mode is rewritable.

2. The method for controlling a recorder according to claim 1, further comprising an erase step of erasing at least the recorded area completely to create the unrecorded area if the recording mode is write-once, and quick erasing the recorded area to create a quick erase area if the recording mode is rewritable.

3. The method for controlling a recorder according to claim 2, further comprising an erase step of erasing the recorded area or the quick erase area completely to create the unrecorded area if the recording mode is write-once, and quick erasing the recorded area to create a quick erase area if the recording mode is rewritable.

4. The method for controlling a recorder according to claim 3, wherein the erase step includes recording management information on the optical recording medium, the management information being intended for identifying the newly-created unrecorded area or quick erase area.

5. The method for controlling a recorder according to claim 2, wherein the erase step is performed when the available recording time of the optical recording medium falls below a desired recording time.

6. The method for controlling a recorder according to claim 3, wherein the erase step is performed when the available recording time of the optical recording medium falls below a desired recording time.

7. The method for controlling a recorder according to claim 4, wherein the erase step is performed when the available recording time of the optical recording medium falls below a desired recording time.

8. The method for controlling a recorder according to claim 1, comprising a recording rate resetting step of prompting a user to modify or reselect the recording rate if the available recording time calculated at the time calculation step falls below a desired recording time.

9. The method for controlling a recorder according to claim 2, comprising a recording rate resetting step of prompting a user to modify or reselect the recording rate if the available recording time calculated at the time calculation step falls below a desired recording time.

10. The method for controlling a recorder according to claim 1, further comprising a management information recording step, said management information recording step recording management information on the optical recording medium, the management information being intended for identifying the newly-created recorded area.

11. An apparatus for controlling a recorder for recording captured moving image information on an optical recording medium including an unrecorded area when necessary, the apparatus comprising:
   a mode selection unit for selecting a recording mode for the optical recording medium at least from between rewritable and write-once, based on a set recording rate, when start recording;
   a recording determination unit for determining a recording status of the optical recording medium at least between the unrecorded area, a recorded area and a quick erase area to be created by quick erasing the recorded area, when start recording;
   a time calculation unit for calculating an available recording time of the optical recording medium with the unrecorded area as a recordable area if the selected recording mode is write-once, and with both of the unrecorded area and the quick erase area as a recordable area if the selected recording mode is rewritable, and
   a recording unit of recording information on the optical recording medium, information is recorded on the unrecorded area if the selected recording mode is write-once, and information is recorded on both of the unrecorded area and the quick erase area if the selected recording mode is rewritable.

* * * * *